UNITED STATES PATENT OFFICE.

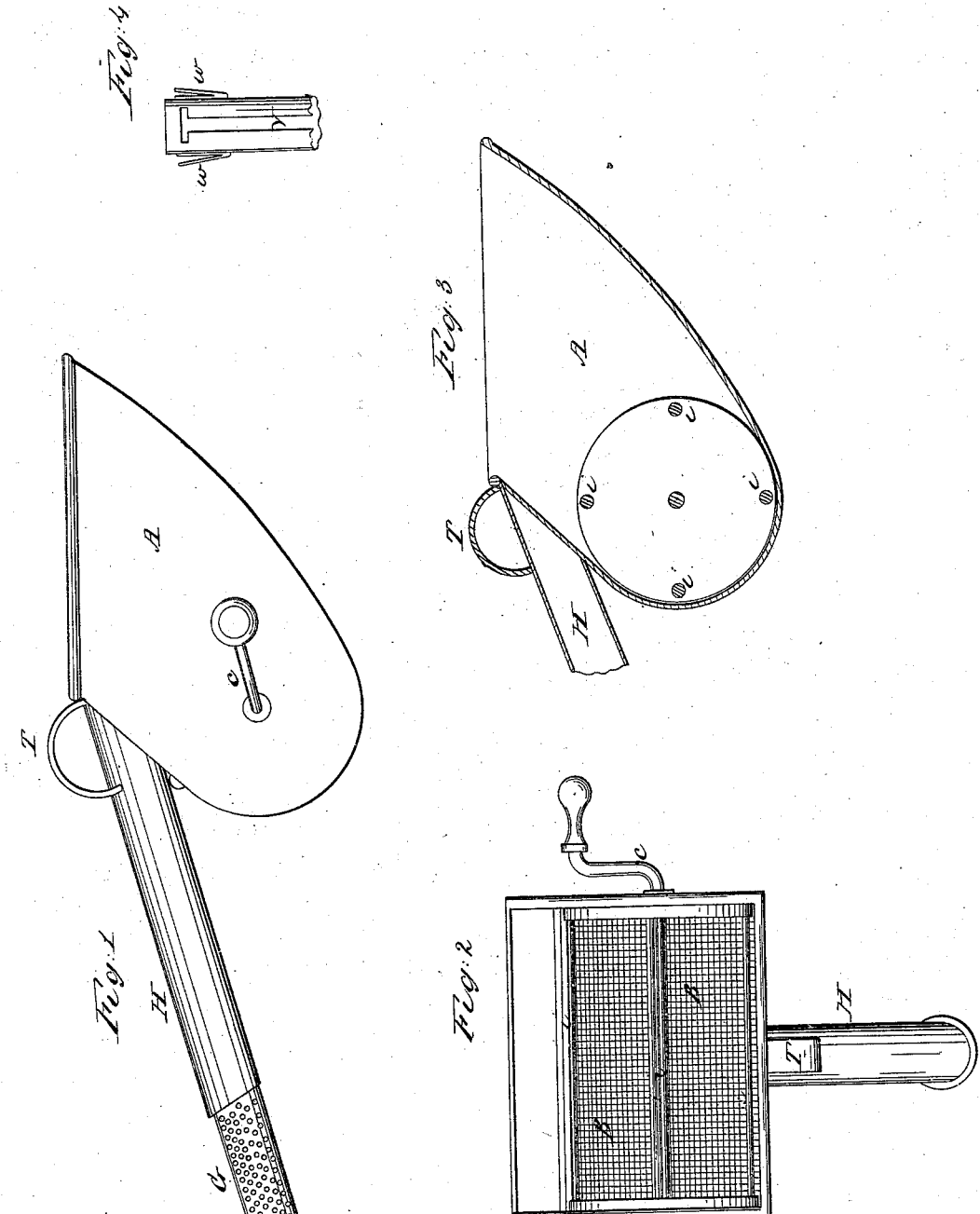

FREDERIC BUCKNAM, OF PORTLAND, MAINE.

IMPROVED SCOOP, SIFTER, GRATER, AND HOLDER.

Specification forming part of Letters Patent No. 54,679, dated May 15, 1866.

*To all whom it may concern:*

Be it known that I, FREDERIC BUCKNAM, of Portland, in the county of Cumberland and State of Maine, have invented a new and Improved Combined Scoop, Sifter, and Nutmeg Grater and Holder; and I hereby declare the following to be a full, clear, and exact description thereof, which will enable others to make and use my invention, reference being had to the accompanying drawings, making part of this specification, in which—

Figure 1 shows a side view of my invention with the grater drawn out from the handle; Fig. 2, an end view of the same; Fig. 3, a section of the scoop and roller; Fig. 4, a side view of the grater showing the means of securing the same in the handle.

My invention consists in the construction of a combination of a scoop, a roller, a sieve, and a nutmeg grater and holder, all arranged and constructed as hereinafter described.

In the accompanying drawings, A shows the scoop; B, the sieve; R, the roller turned by the crank c.

In the handle H is seen the nutmeg-grater, G. This is held in the hollow of the handle by the springs w w, Fig. 4. A slot is cut in one side of the grater to admit of the entrance of a nutmeg. This is seen at v, Fig. 4, and v, Fig. 1. The grater is thrust into the handle when not in use, as is seen in Fig. 3.

The roller is formed from two trucks, t t, united by rods i i i i, and turning upon an axle set in the sides of the scoop. The rods fixed in the trucks are turned by the crank c against the curved net-work forming the sieve.

T shows a thumb-piece for convenience in holding the device when in use.

When the grater is thrust into the handle the bottom k thereof will serve for a rest for the device. The shape of the device is seen in the drawings. The roller moved against the sieve sifts the flour through the same evenly. The grater can be easily withdrawn from the handle when to be used, and as readily replaced.

What I claim as my invention, and desire to secure by Letters Patent, is—

The combination, with a scoop of the described form and kind, of the roller R, sieve B, handle H, having the grater and holder G, made as specified, all constructed, arranged, and operated as set forth.

FREDERIC BUCKNAM.

Witnesses:
WILLIAM H. CLIFFORD,
GEORGE F. CLIFFORD.